Dec. 17, 1940.  B. A. DIGGINS  2,225,039
OPTICAL SYSTEM
Filed Aug. 20, 1938
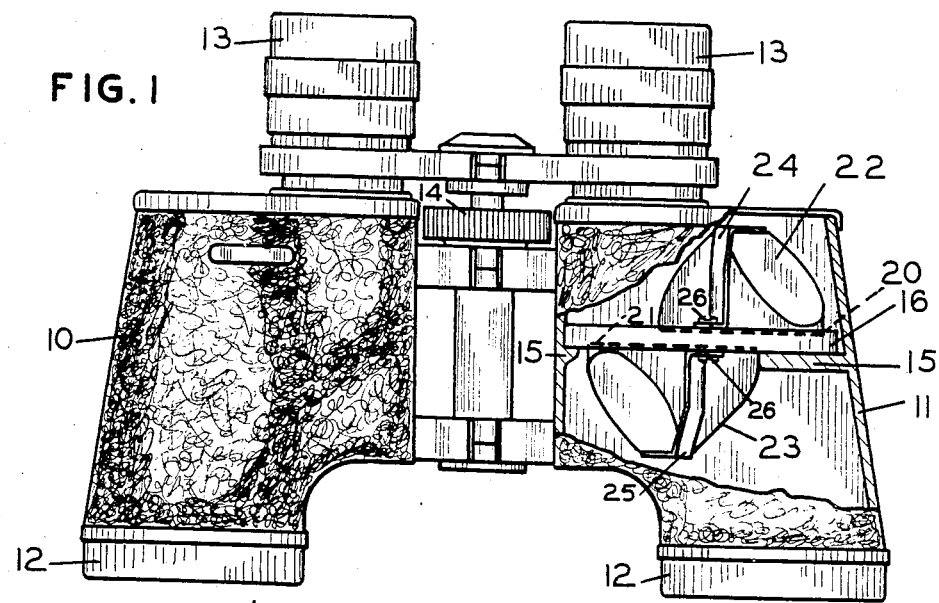
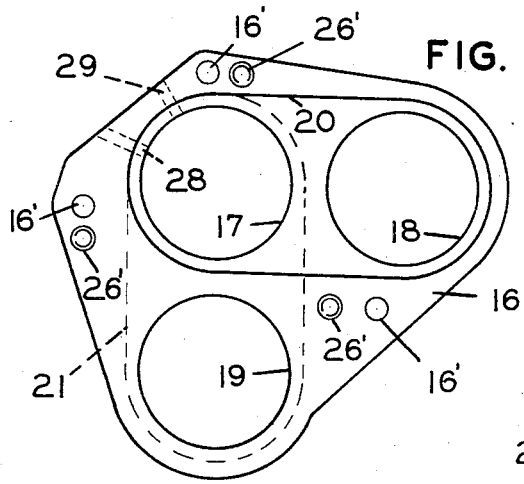
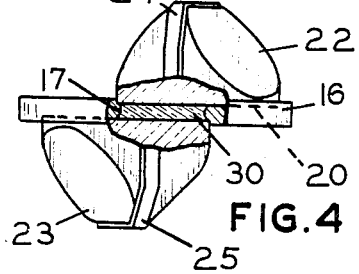
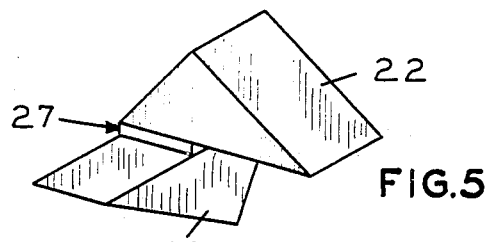
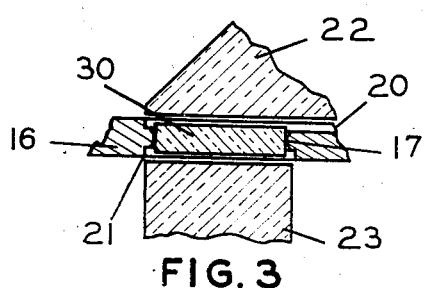
BARTHOLOMEW A. DIGGINS
INVENTOR
BY  *J. A. Ellestad*
ATTORNEY Patented Dec. 17, 1940

2,225,039

UNITED STATES PATENT OFFICE 2,225,039

OPTICAL SYSTEM

Bartholomew A. Diggins, Irondequoit, N. Y., assignor to Bausch & Lomb Optical Company, Rochester, N. Y., a corporation of New York Application August 20, 1938, Serial No. 225,979

1 Claim. (Cl. 88—33)

The present invention relates to optical instruments and more particularly to inverting and reverting prism systems such as those used in prism telescopes or binoculars.

It has long been known that there is a loss of light at the adjacent glass-air surfaces of the prism systems of prism telescopes or binoculars and many attempts have been made to avoid that loss. These attempts have usually consisted in cementing the prisms together before mounting, making complex one-piece prisms or cementing a piece of glass between the elements of the optical system. These attempted corrections have usually been failures for a number of apparent reasons.

The cementing of the prisms is impractcal because the resultant cemented combination is fragile to handle and difficult to mount and align because of its peculiar shape. Furthermore, mounting such a cemented combination is apt to strain or even break the cement bond. Even if the strain of mounting were not sufficient to break the cement bond, it would probably hasten the deterioration of the cement.

The one-piece prism is obviously impractical because of the great cost of manufacture. The surfaces have to be optically flat and the angles so closely related and controlled that, if it is possible to make such prisms, their cost would be prohibitive.

Glass plates or blocks cemented between the optical elements are impractical for both of the above reasons. These plates or blocks not only add further optical surfaces which must be ground to optical precision but the angular relation of these surfaces and the length of the light path must be held to very close limits. The production of such blocks requires such high precision that the cost would far exceed the value of the improvement.

One of the objects of my invention is to provide a method of reducing the surface losses between two optical elements separated by an air space. Another object is to provide a pair of spaced optical elements with a transparent connecting member formed in place between them. A further object is to provide a prism system in which a transparent member of moldable material is formed between the prisms and in optical contact therewith. These and other objects and advantages reside in certain novel features of construction, arrangement and combination of parts as will hereinafter be more fully set forth and pointed out in the appended claim.

Referring to the drawing:

Fig. 1 is an elevation of a pair of prism binoculars with parts broken away to show internal structure.

Fig. 2 is a plan view of a prism table embodying one form of my invention.

Fig. 3 is a fragmentary vertical section showing another form of my invention prior to assembly.

Fig. 4 is a side elevation of the prism combination of Fig. 3 after assembly.

Fig. 5 is a perspective view of a prism assembly embodying my invention.

One embodiment of the present invention is illustrated in the drawing in connection with a pair of prism binoculars. These binoculars consist of two body members 10 and 11 hingedly secured together and each carrying an objective 12 at one end and an eyepiece 13 at the other. The usual focusing knob 14 may be provided. Within each body member is a shelf 15 to which the prism table 16 carrying a Porro prism combination is suitably secured as, for example, by screws not shown which extend through the holes 16'. This construction is well known to those skilled in the art.

The prism table 16 consists of a substantially flat plate having three spaced holes 17, 18 and 19 therethrough. As shown in Fig. 2, these holes form an isosceles right triangle, the hole 17 being located opposite the hypotenuse of the triangle. One surface of the table 16 is recessed as indicated at 20, the recess 20 connecting the holes 17 and 18, and the other side is recessed as indictaed at 21, the recess 21 connecting the holes 17 and 19. The two isosceles right prisms 22 and 23 are mounted in the recesses 20 and 21, respectively, with their hypotenuse surfaces resting on the table 16 at the bottom of the recesses. These prisms 22 and 23 are fixed in the recesses by straps 24 and 25, respectively, which extend over the prisms and are secured to the prism table as, for example, by screws 26 which are threaded into the holes 26' in the prism table 16.

Ordinarily, the prisms 22 and 23 are separated by an air space and thus there are losses by reflection at the two adjacent glass-air surfaces. According to the present invention, a transparent member indicated generally at 27 in Fig. 5 is placed in optical contact with both prisms 22 and 23 and thus eliminates the glass-air surfaces with their attendant reflection losses. This member must be clear and transparent in thick sections and must be moldable at reasonable temperatures and pressures. Various synthetic resins such as the acrylic acid resin commercially known as Plexiglas and the vinyl resin commercially known as Vinylite may be used. Other transparent substances such as ethyl silicate can also be used.

The connecting member 27 is formed in different ways depending on the original condition of the material used, but I prefer to form it in place when the prisms 22 and 23 are mounted. Fig. 2 illustrates the construction of the prism table 16 when the material forming the member 27 is applied in a liquid state and allowed to harden. In this embodiment, the prism table 16 is provided with an inlet 28 and an outlet 29 opening into the hole 17. The two prisms 22 and 23 are secured on opposite sides of the table 16 and form closures for the ends of the hole 17. A transparent liquid is introduced through the inlet 28 until the hole 17 is entirely filled, the displaced air escaping through outlet 29. The liquid is then allowed to harden and form the optical connection 27 illustrated in Fig. 5.

In the embodiment illustrated in Figs. 3 and 4, a solid plug 30 of transparent material is used. This plug 30, as shown in Fig. 3, is very slightly thicker than the table 16 at the recesses 20 and 21. The plug 30 is softened either by heat or by the application of a suitable plasticizer and the two prisms 22 and 23 are pressed against the plug 30 until they seat normally in their respective recesses 20 and 21. The prisms 22 and 23 are then secured in position by the straps 24 and 25, respectively, and the plug 30 allowed to harden as a connecting member as shown in Fig. 5.

In order to provide a place for the plug 30 to expand when it is pressed by the prisms 22 and 23, the walls of the hole 17 are rounded as shown in Figs. 3 and 4 or are otherwise suitably recessed.

The choice of the two methods illustrated depends entirely on the original condition of the material used to form the member 27. Ethyl silicate is usually a fluid and in that event the method of Fig. 2 would be used. The acrylic acid resin Plexiglas can be obtained either as a liquid or in plugs and hence either method could be used with this resin. Other transparent resins and mixtures of resins are well known and the three materials recited are given merely by way of example. Likewise, the various plasticizers or softening agents, and solvents for these transparent materials are well known to those skilled in the art.

After the prisms 22 and 23 have been mounted and the transparent connecting member 27 has been formed, the table 16 is mounted on the shelf 15 in such a way that the hole 18 is in alignment with the objective 12 and the hole 19 in alignment with the eyepiece 13. The table 16 is then secured in position as is well known in the art.

From the foregoing, it will be apparent that I am able to attain the objects of my invention and provide a simple, practical and inexpensive system for eliminating the surface losses between optical elements. While I have illustrated my invention as applied to a Porro prism system used in prism binoculars, other applications and uses are readily apparent to those skilled in the art. Various modifications can also be made without departing from the spirit of my invention or the scope of the appended claim.

I claim:

In a prism system for telescopes and the like comprising a substantially flat table having three spaced holes therethrough with an isosceles right angle glass prism secured on one side of said table with its hypotenuse face resting on the table so that one end extends over one of said holes and with a second isosceles right angle glass prism secured on the other side of said table with its hypotenuse face resting on the table so that one end extends over the hole covered by said first mentioned prism, the other ends of the hypotenuse faces of said prisms each covering a separate hole in said table different from said first mentioned hole, said table also having a plurality of conduits provided therein and connecting the interior of the hole covered by both of said prisms with a surface of said table, a clear transparent member having an index of refraction close to that of the prisms and formed of a resin from the class consisting of acrylic and vinyl resins molded within the hole covered by both of said prisms and substantially filling said hole and being in optical contact with said prisms, said transparent member being introduced in a liquid state into said hole through one of said conduits.

BARTHOLOMEW A. DIGGINS.